US010208602B2

United States Patent
Thornton et al.

(10) Patent No.: US 10,208,602 B2
(45) Date of Patent: Feb. 19, 2019

(54) ASYMMETRIC DIFFUSER OPENING FOR FILM COOLING HOLES

(71) Applicant: United Technologies Corporation, Hartford, CT (US)

(72) Inventors: Lane Thornton, Ellington, CT (US); Ryan Alan Waite, Glastonbury, CT (US); Peter Balawajder, Vernon, CT (US); Benjamin F. Hagan, Manchester, CT (US)

(73) Assignee: United Technologies Corporation, Farmington, CT (US)

( * ) Notice: Subject to any disclaimer, the term of this patent is extended or adjusted under 35 U.S.C. 154(b) by 419 days.

(21) Appl. No.: 14/697,329

(22) Filed: Apr. 27, 2015

(65) Prior Publication Data

US 2016/0312619 A1 Oct. 27, 2016

(51) Int. Cl.
*F01D 5/18* (2006.01)
*F01D 25/12* (2006.01)
(Continued)

(52) U.S. Cl.
CPC .............. *F01D 5/186* (2013.01); *F01D 9/041* (2013.01); *F01D 9/065* (2013.01); *F01D 11/08* (2013.01); *F01D 25/12* (2013.01); *F02C 3/04* (2013.01); *F23R 3/002* (2013.01); *F01D 9/02* (2013.01); *F05D 2220/32* (2013.01); *F05D 2230/90* (2013.01); *F05D 2240/12* (2013.01); *F05D 2240/30* (2013.01); *F05D 2240/35* (2013.01); *F05D 2240/55* (2013.01); *F05D 2240/81* (2013.01); *F05D 2250/33* (2013.01); (Continued)

(58) Field of Classification Search
CPC . F01D 5/186; F01D 9/02; F01D 25/12; F05D 2230/90
See application file for complete search history.

(56) References Cited

U.S. PATENT DOCUMENTS

| 2,149,510 A | * | 3/1939 | Georges | .................. F01D 5/186 |
| | | | | 29/889.7 |
| 4,653,983 A | * | 3/1987 | Vehr | ........................ B23H 9/10 |
| | | | | 415/115 |

(Continued)

FOREIGN PATENT DOCUMENTS

| EP | 1898051 | 3/2008 |
| EP | 2987954 | 2/2016 |
| WO | 2016068860 | 5/2016 |

OTHER PUBLICATIONS

Extended European Search Report dated Sep. 1, 2016 in European Application No. 16167089.8.

*Primary Examiner* — Todd E Manahan
*Assistant Examiner* — Eric Linderman
(74) *Attorney, Agent, or Firm* — Snell & Wilmer, L.L.P.

(57) ABSTRACT

A film cooled component may comprise a cooling chamber and a first ligament centered about a first axis. The first ligament may be in fluid communication with the cooling chamber. A first meter may be disposed at an end of the first ligament. A first diffuser may extend from the first meter to a surface of the film cooled component. The first diffuser may comprise a first tapered sidewall oriented at an angle of between 5 degrees to 15 degrees relative to the first axis. The first diffuser may further comprise a first non-tapered sidewall oriented at an angle less than 5 degrees relative to the first axis.

20 Claims, 3 Drawing Sheets

(51) Int. Cl.
*F01D 9/04* (2006.01)
*F01D 11/08* (2006.01)
*F02C 3/04* (2006.01)
*F01D 9/06* (2006.01)
*F23R 3/00* (2006.01)
*F01D 9/02* (2006.01)

(52) U.S. Cl.
CPC ...... *F05D 2250/72* (2013.01); *F05D 2250/73* (2013.01); *F05D 2260/202* (2013.01); *F05D 2260/2212* (2013.01); *F23R 2900/03042* (2013.01); *Y02T 50/676* (2013.01)

(56) References Cited

U.S. PATENT DOCUMENTS

| | | | | |
|---|---|---|---|---|
| 4,672,727 A * | 6/1987 | Field | | B23P 15/02 29/527.2 |
| 4,700,544 A * | 10/1987 | Fucci | | F23R 3/045 60/757 |
| 5,326,224 A * | 7/1994 | Lee | | F01D 5/186 416/90 R |
| 5,342,172 A * | 8/1994 | Coudray | | F01D 5/186 416/95 |
| 5,382,133 A * | 1/1995 | Moore | | F01D 5/186 415/115 |
| 6,092,982 A * | 7/2000 | Ikeda | | F01D 5/186 137/806 |
| 6,183,199 B1 * | 2/2001 | Beeck | | F01D 5/186 416/97 R |
| 6,383,602 B1 * | 5/2002 | Fric | | F01D 5/186 415/115 |
| 7,186,085 B2 * | 3/2007 | Lee | | F01D 5/186 416/97 R |
| 7,246,992 B2 * | 7/2007 | Lee | | B23H 9/10 415/115 |
| 7,374,401 B2 * | 5/2008 | Lee | | F01D 5/18 415/115 |
| 8,052,378 B2 * | 11/2011 | Draper | | F01D 5/186 415/115 |
| 8,066,484 B1 * | 11/2011 | Liang | | F01D 5/186 415/115 |
| 9,482,100 B2 * | 11/2016 | Kohli | | F01D 5/18 |
| 9,599,411 B2 * | 3/2017 | Tanaka | | F01D 5/186 |
| 9,945,233 B2 * | 4/2018 | Tanaka | | B23H 9/10 |
| 2005/0123401 A1 * | 6/2005 | Bunker | | F01D 5/186 416/97 R |
| 2005/0135931 A1 * | 6/2005 | Nakamata | | F01D 5/186 416/97 R |
| 2006/0073015 A1 * | 4/2006 | Liang | | F01D 5/186 416/97 R |
| 2006/0073016 A1 * | 4/2006 | Liang | | F01D 5/186 416/97 R |
| 2007/0071593 A1 * | 3/2007 | Rathmann | | F01D 5/186 415/115 |
| 2008/0057271 A1 * | 3/2008 | Bunker | | F01D 5/186 428/137 |
| 2009/0169394 A1 * | 7/2009 | Crow | | B23H 9/10 416/96 R |
| 2010/0040459 A1 * | 2/2010 | Ohkita | | F01D 5/186 415/177 |
| 2010/0329846 A1 * | 12/2010 | Ramachandran | | F01D 5/186 415/115 |
| 2011/0236178 A1 * | 9/2011 | Devore | | B22C 9/04 415/1 |
| 2013/0175015 A1 * | 7/2013 | Tanaka | | F01D 5/186 165/168 |
| 2013/0259645 A1 * | 10/2013 | Bergholz, Jr. | | F01D 5/18 415/115 |
| 2013/0294898 A1 * | 11/2013 | Lee | | F01D 25/12 415/177 |
| 2014/0010632 A1 * | 1/2014 | Spangler | | F01D 5/186 415/115 |
| 2014/0271226 A1 * | 9/2014 | Giglio | | F01D 5/186 416/97 R |
| 2014/0271229 A1 * | 9/2014 | Nita | | F01D 5/186 416/97 R |
| 2015/0159871 A1 * | 6/2015 | Pearson | | F23R 3/06 60/754 |
| 2016/0047250 A1 * | 2/2016 | Lewis | | F01D 5/186 415/115 |
| 2016/0089692 A1 * | 3/2016 | Reid | | C23C 4/18 427/448 |
| 2016/0090843 A1 * | 3/2016 | Albert | | C23C 4/134 60/752 |
| 2016/0186576 A1 * | 6/2016 | Thornton | | F01D 5/186 415/115 |
| 2016/0208619 A1 * | 7/2016 | Quach | | F01D 5/186 |
| 2016/0298464 A1 * | 10/2016 | Spangler | | F01D 5/187 |
| 2016/0356498 A1 * | 12/2016 | Gerendas | | F01D 5/186 |
| 2017/0044913 A1 * | 2/2017 | Spangler | | F01D 5/186 |
| 2017/0081958 A1 * | 3/2017 | Xu | | F01D 5/187 |
| 2017/0081959 A1 * | 3/2017 | Lewis | | F01D 5/186 |

* cited by examiner

ASYMMETRIC DIFFUSER OPENING FOR FILM COOLING HOLES

FIELD OF INVENTION

The present disclosure relates generally to a gas turbine engine and more specifically to turbine blades and/or vanes exposed to high temperature.

BACKGROUND

A gas turbine engine may include a turbine section with multiple rows or stages of stator vanes and rotor blades that interact or react with a high temperature gas flow to create mechanical power. In a gas turbine engine, the turbine rotor blades drive the compressor and an electric generator to generate electrical power. The efficiency of the engine can be increased by passing a higher temperature gas flow through the turbine. However, the turbine inlet temperature is limited to the vane and blade (airfoils) material properties and the cooling capabilities of these airfoils.

Film cooling may be used on the vanes and blades to manage component temperatures. Film cooling involves ejecting cooling air across a surface of a high-temperature part. Round cooling holes may have poor performance due to the lack of a diffuser, yet they are manufacturable within tolerances. Symmetric diffuser designs may theoretically provide more effective cooling performance but lack manufacturability. For example, diffuser holes designed to be completely separate openings may overlap after manufacturing.

SUMMARY

A film cooled component may comprise a cooling chamber and a first ligament centered about a first axis. The first ligament may be in fluid communication with the cooling chamber. A first meter may be disposed at an end of the first ligament. A first diffuser may extend from the first meter to a surface of the film cooled component. The first diffuser may comprise a first tapered sidewall oriented at an angle of 5 degrees to 15 degrees relative to the first axis. The first diffuser may further comprise a first non-tapered sidewall oriented at an angle less than 5 degrees relative to the first axis.

In various embodiments, a second ligament may be centered about a second axis. A second meter may be disposed at an end of the second ligament. A second diffuser may also extend from the second meter. The first diffuser and the second diffuser may have reflection symmetry. The second diffuser may comprise a second tapered sidewall oriented at an angle of 5 degrees to 15 degrees relative to the second axis. The second diffuser may also comprise a second non-tapered sidewall oriented at an angle less than 5 degrees relative to the second axis. The first non-tapered sidewall and the second non-tapered sidewall may be parallel. The first non-tapered sidewall and the second non-tapered sidewall may be adjacent one another. A sidewall of the first ligament and the first non-tapered sidewall may be disposed a same distance from the first axis. At least one of a vane, a stator, or a blade outer air seal may define the first ligament, the first meter, and the first diffuser.

A film cooling system may comprise a cooling chamber. A first film cooling hole may be in fluid communication with the cooling chamber. The first film cooling hole may comprise a first asymmetric diffuser. A second film cooling hole may be in fluid communication with the cooling chamber and disposed adjacent the first film cooling hole. The second film cooling hole may comprise a second asymmetric diffuser having reflection symmetry with the first asymmetric diffuser.

In various embodiments, the first film cooling hole may comprise a first ligament centered about a first axis and in fluid communication with the cooling chamber. A first meter may be disposed at an end of the first ligament. The first asymmetric diffuser may extend from the first meter. The first asymmetric diffuser may comprise a first tapered sidewall and a first non-tapered sidewall. The second asymmetric diffuser may comprise a second tapered sidewall and a second non-tapered sidewall. The first non-tapered sidewall may be disposed adjacent the second non-tapered sidewall.

In various embodiments, the first film cooling hole may be centered about an axis with the first tapered sidewall oriented at an angle of 5 degrees to 15 degrees relative to the axis. The first non-tapered sidewall may be oriented at an angle less than 5 degrees relative to the axis. A sidewall of the first ligament and the first non-tapered sidewall may be disposed a same distance from the axis. The first non-tapered sidewall and the second non-tapered sidewall may be parallel. The first film cooling hole and the second film cooling hole may be defined by at least one of a blade outer air seal, a stator, or a vane.

A gas turbine engine may comprise a compressor section and a combustor aft of the compressor section. The combustor may also be in fluid communication with the compressor section. A turbine section may be aft of the combustor and in fluid communication with the combustor. A component of the turbine section may comprise a first film cooling hole with a first asymmetric diffuser. A second film cooling hole with a second asymmetric diffuser may be adjacent the first film cooling hole. The first asymmetric diffuser and the second asymmetric diffuser may have reflection symmetry.

In various embodiments, the component of the turbine section may comprise at least one of a blade outer air seal, a stator, or a vane. The first asymmetric diffuser may comprise a first tapered sidewall and a first non-tapered sidewall, with the second asymmetric diffuser having a second tapered sidewall and a second non-tapered sidewall. The first non-tapered sidewall and the second non-tapered sidewall may be parallel. The first non-tapered sidewall may also be disposed adjacent the second non-tapered sidewall.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

As used herein, "aft" refers to the direction associated with the tail (e.g., the back end) of an aircraft, or generally, to the direction of exhaust of the gas turbine. As used herein, "forward" refers to the direction associated with the nose (e.g., the front end) of an aircraft, or generally, to the direction of flight or motion.

As used herein, "distal" refers to the direction radially outward, or generally, away from the axis of rotation of a turbine engine. As used herein, "proximal" refers to a direction radially inward, or generally, towards the axis of rotation of a turbine engine.

Figure 1:
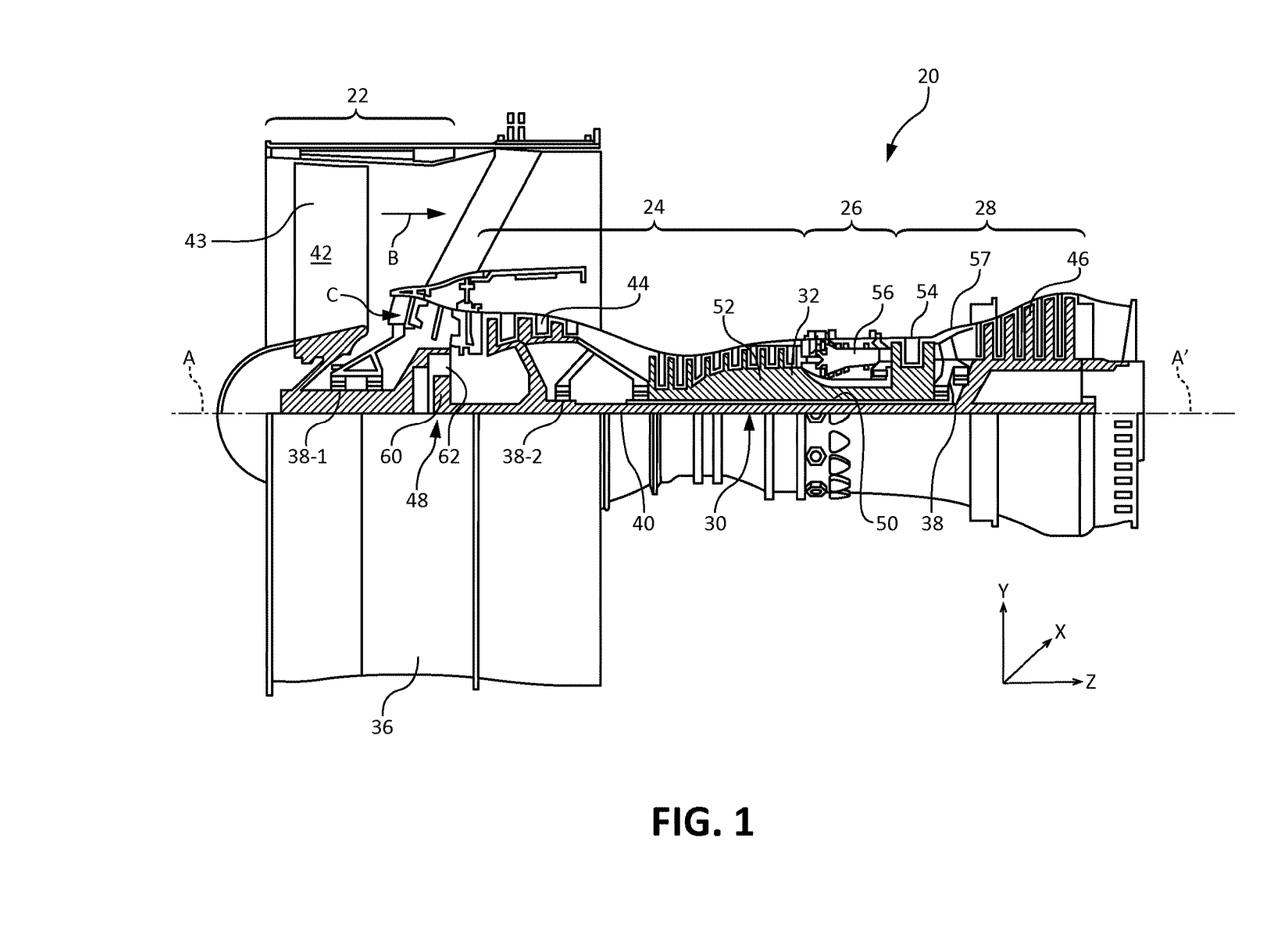
FIG. 1 illustrates an exemplary gas turbine engine, in accordance with various embodiments.

In various embodiments and with reference to FIG. 1, a gas-turbine engine 20 is provided. Gas-turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive coolant along a bypass flow-path B while compressor section 24 can drive coolant along a core flow-path C for compression and communication into combustor section 26 then expansion through turbine section 28. Although depicted as a turbofan gas-turbine engine 20 herein, it should be understood that the concepts described herein are not limited to use with turbofans as the teachings may be applied to other types of turbine engines including three-spool architectures.

Gas-turbine engine 20 may generally comprise a low speed spool 30 and a high speed spool 32 mounted for rotation about an engine central longitudinal axis A-A' relative to an engine static structure 36 via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2. In various embodiments, bearing system 38, bearing system 38-1, and bearing system 38-2 may be contained within a bearing housing and/or integrated into an oil delivery system, as described in further detail below.

Low speed spool 30 may generally comprise an inner shaft 40 that interconnects a fan 42, a low pressure compressor section 44 and a low pressure turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54 ("HPT"). A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Turbines 46, 54 rotationally drive the respective low speed spool 30 and high speed spool 32 in response to the expansion.

Gas-turbine engine 20 may be, for example, a high-bypass ratio geared aircraft engine. In various embodiments, the bypass ratio of gas-turbine engine 20 may be greater than about six (6). In various embodiments, the bypass ratio of gas-turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas-turbine engine 20 is greater than about ten (10:1). In various embodiments, the diameter of fan 42 may be significantly larger than that of the low pressure compressor section 44, and the low pressure turbine 46 may have a pressure ratio that is greater than about five (5:1). Low pressure turbine 46 pressure ratio may be measured prior to inlet of low pressure turbine 46 as related to the pressure at the outlet of low pressure turbine 46 prior to an exhaust nozzle.

In various embodiments, HPT 54 may comprise alternating rows of rotating rotors and stationary stators. Stators may have a cantilevered configuration or a shrouded configuration. More specifically, stator may comprise a stator vane, a casing support and a hub support. In this regard, stator vane may be supported along an outer diameter by casing support and along an inner diameter hub support. In contrast, a cantilevered stator may comprise a stator vane that is only retained and/or supported at the casing (e.g., an outer diameter).

In various embodiments, rotors may be configured to expand a fluid flow and extract energy. Stators may be configured to receive and straighten the fluid flow. In operation, the fluid flow discharged from the trailing edge of stators may be straightened (e.g., the flow may be directed in a substantially parallel path to the centerline of the engine and/or HPT) to increase and/or improve the efficiency of the engine and, more specifically, to achieve maximum and/or near maximum compression and efficiency when the straightened air is compressed and spun.

According to various embodiments, the systems and apparatus disclosed herein are configured to reduce the local temperature around the cooling holes. This may increase the high cycle fatigue life of the associated parts.

Figure 2:
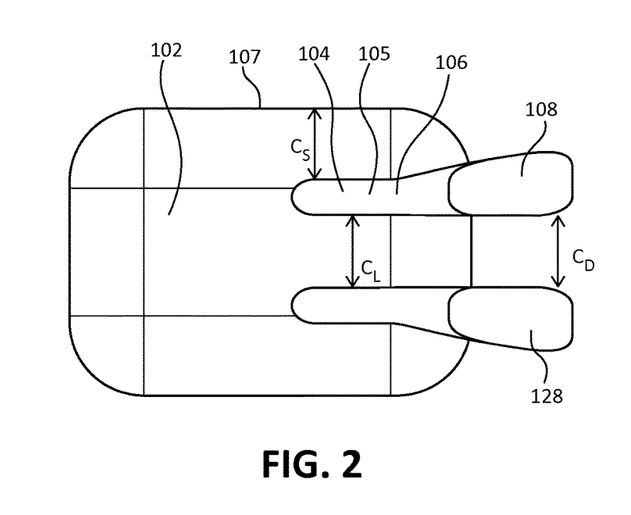
FIG. 2 illustrates a pair of film cooling holes with asymmetric diffusers in fluid communication with a cooling chamber and spaced for manufacturability, in accordance with various embodiments.

With reference to FIG. 2, cooling system 100 is shown, in accordance with various embodiments. Cooling system 100 may comprise a cooling chamber 102 to collect cooling fluid and supply cooling fluid to film cooling holes 104. Film cooling holes 104 may open into cooling chamber 102 and extract cooling fluid retained in cooling chamber 102. Film cooling hole 104 may comprise a meter 106 defining a smallest hydraulic diameter of film cooling hole 104 where meter 106 is non-circular or smallest diameter where meter 106 is circular. Diffuser 108 may extend from meter 106 towards a surface to be cooled. Cooling chamber 102 may be a small and/or narrow core with minimal surface area to receive film cooling holes. For example, cooling chamber 102 may be a narrow chamber in a blade tip. In another example, a larger chamber with partially obscured features (e.g., vane platform cores around airfoil cores) may also make use of the paired film cooling holes of the present disclosure. In that regard, a pair of film cooling holes as illustrated may provide a widened film from the diffuser while maintaining clearance distances.

In various embodiments, film cooling holes 104 may be spaced from edges of cooling chamber 102 to provide sidewall clearance. In that regard, ligament 105 of film cooling hole 104 may be in fluid communication with cooling chamber 102 with a clearance distance $C_S$ separating ligament 105 from sidewall 107 of cooling chamber 102. Clearance distance $C_S$ may be designed to allow for shifts in the actual relative location of sidewall 107 and ligament 105 due to manufacturing tolerance. Similarly, diffuser 108 may be separated from diffuser 128 by clearance distance $C_D$. Clearance distance $C_D$ may be designed to allow for shifts in the relative locations of diffuser 108 and diffuser 128 resulting from manufacturing tolerances. Furthermore, ligaments 105 may also be spaced from one another to maintain a minimum ligament clearance $C_L$. In that regard, diffuser 108 and diffuser 128 may provide improved cooling over round film cooling holes and still prevent overlapping diffusers resulting from imprecisions incident to manufacturing.

Figure 3:
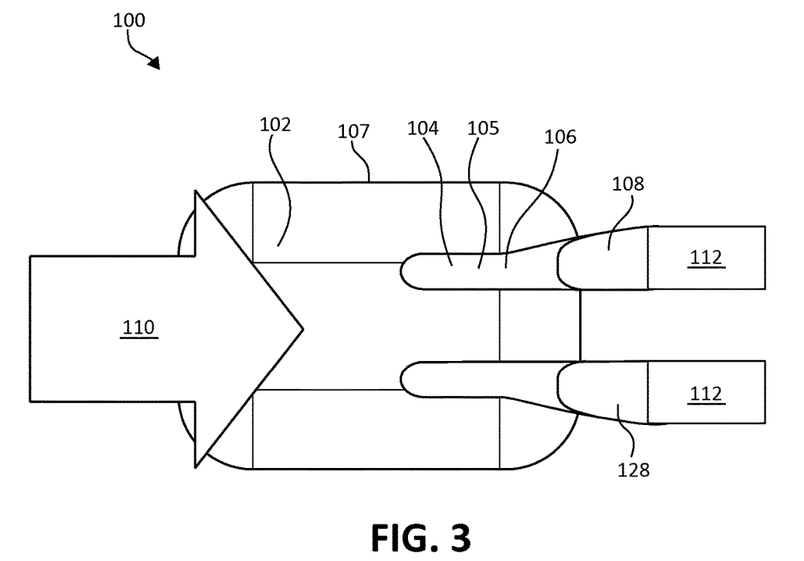
FIG. 3 illustrates a pair of film cooling holes with asymmetric diffusers in fluid communication with a cooling chamber ejecting cooling fluid into a gas path, in accordance with various embodiments.

With reference to FIG. 3, cooling system 100 is shown ejecting a film of cooling fluid 112 into a high-temperature gas path 110, in accordance with various embodiments. Cooling fluid 112 enters film cooling hole 104 and passes through meter 106 into diffuser 108. Diffuser 108 ejects cooling fluid 112 in a thin film to provide insulation from high-temperature gas path 110. Diffuser 108 may provide a widened outlet for cooling fluid 112 while maintaining clearance between adjacent film holes and diffusers.

Figure 4:
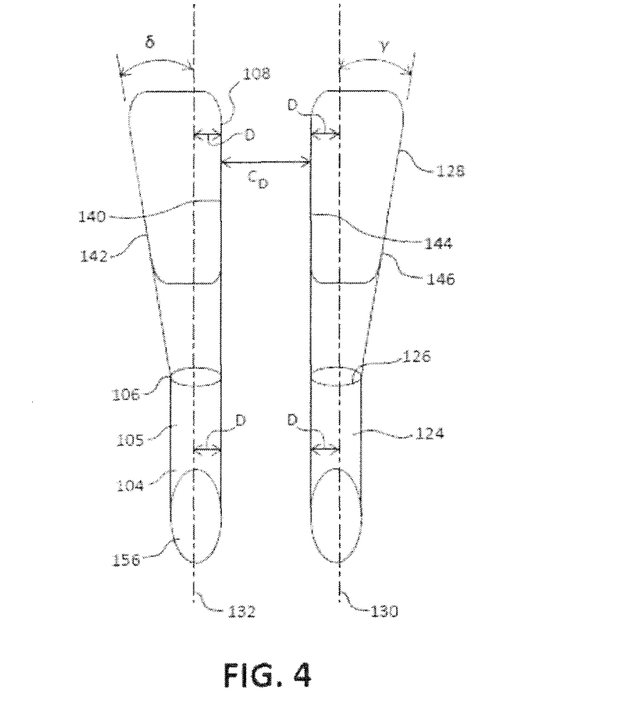
FIG. 4 illustrates a pair of film cooling holes with asymmetric diffusers mirroring one another, in accordance with various embodiments.
Figure 5:
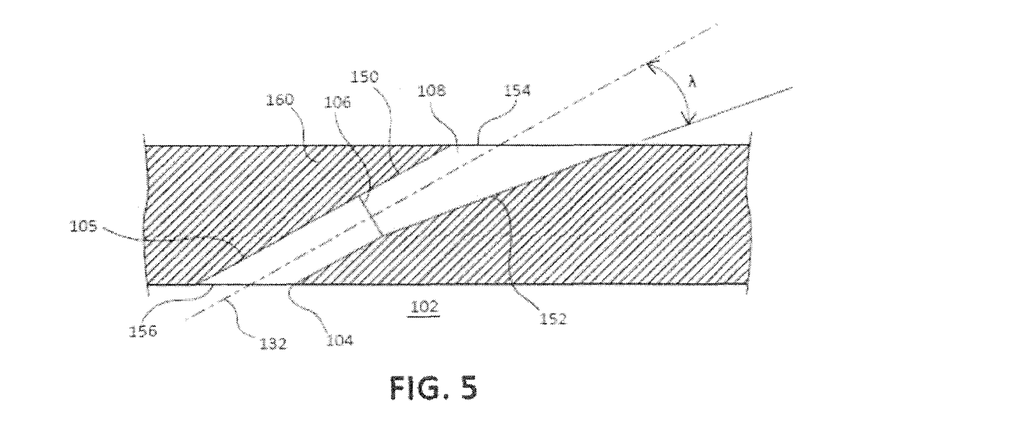
FIG. 5 illustrates a cross sectional view of a film cooling hole with an asymmetric diffuser, in accordance with various embodiments.

With reference to FIGS. 4 and 5, the asymmetric geometry of film cooling hole 104 is shown, in accordance with various embodiments. Film cooling hole 104 comprise ligament 105, which may be a cylindrical tube with opening 156 into cooling chamber 102 (of FIG. 2). Ligament 105 and meter 106 of film cooling hole 104 may be centered about axis 132. Diffuser 108 may be asymmetric about axis 132. In that regard, the sidewall of ligament 105 may be a distance D from axis 132, and sidewall 140 of diffuser 108 may be substantially the same distance D from axis 132, as illustrated in FIG. 4. Distance D may also be equal to a cross-sectional radius of the cylindrical shape of ligament 105. Diffuser 108 may also have tapered sidewall 142 flaring outward relative to axis 132 as the distance from meter 106 increases. In that regard, sidewall tapered 142 may be oriented at a diffusion angle delta ("$\delta$") (e.g. a first diffusion angle defining a first asymmetry of diffuser 108) relative to axis 132.

In various embodiments, diffusion angle $\delta$ of tapered sidewall 142 relative to axis 132 may be greater than 5 degrees, or in a range between 5 and 15 degrees. For example, diffusion angle $\delta$ of tapered sidewall 142 relative to axis 132 may be 10 degrees. Sidewall 140 of diffuser 108 is depicted as being parallel to axis 132, however sidewall 140 may also have a small angle relative to axis 132 (i.e., an angle less than 5 degrees in either direction). Stated another way, sidewall 140 has a second diffusion angle ("$\delta_2$") relative to axis 132 defining a second asymmetry of diffuser 108. Thus, diffuser 108 comprises tapered sidewall 142 that tapers outward at a greater angle than sidewall 140. In that regard, sidewall 140 may be a relatively non-tapered or mildly tapered sidewall compared to tapered sidewall 142. Sidewall 140 and sidewall 142 thus give diffuser 108 an asymmetric geometry.

In various embodiments, a film cooling 124 hole may be disposed adjacent film cooling hole 104. In that regard, film cooling hole 124 may be separated from film cooling hole 104 by clearance distance $C_D$. In particular, sidewall 140 of diffuser 108 and sidewall 144 of diffuser 128 may maintain at least a clearance distance $C_D$ between one another, with sidewall 140 and sidewall 144 oriented parallel to one another and defining adjacent sides of diffuser 108 and diffuser 128, respectively. Sidewall 144 of diffuser 128 may be similar to sidewall 140, and tapered sidewall 146 of diffuser 128 may be similar to tapered sidewall 142. Stated another way, sidewall 144 has a fourth diffusion angle ("$\gamma_2$") relative to axis 130 defining a fourth asymmetry of diffuser 108. Film cooling hole 124 may be centered about axis 130.

In various embodiments, tapered sidewall 146 may be oriented at a diffusion angle gamma ("$\gamma$") (e.g. a third diffusion angle defining a third asymmetry of diffuser 128) relative to axis 130. Diffusion angle $\delta$ and diffusion angle $\gamma$ may oppose one another such that tapered sidewall 142 and tapered sidewall 146 are disposed further apart from one another at points of diffuser 108 and diffuser 128 further from meter 106 and meter 126, respectively. Film cooling hole 104 and film cooling hole 124 may be mirrored such that diffusion angle $\delta$ and diffusion angle $\gamma$ are substantially equal (i.e., within manufacturing tolerances). In that regard, film cooling hole 104 and film cooling hole 124 may have reflection symmetry with one another (i.e., the film cooling holes have symmetry across a plane disposed between them). Film cooling hole 104 and film cooling hole 124 may be formed adjacent one another to enable favorable film coverage and manufacturability. Film cooling hole 104 and film cooling hole 124 may thus provide film cooling in a manufacturable manner over or cooling chamber (e.g., cooling chamber 102 of FIG. 2) with limited space for film cooling holes.

In various embodiments, and with reference to FIG. 5, film cooling hole 104 is shown formed in a surface of component 160 and oriented about axis 132. Component 160 may comprise a film cooled component such as a blade outer air seal ("BOAS"), a vane, a stator, or other suitable component operating in a high-temperature environment and defining a film cooling hole 104. Film cooling hole 104 may comprise an opening 156 of ligament 105 into a cooling chamber (e.g., cooling chamber 102 of FIG. 2). Ligament 105 may open at meter 106 into diffuser 108. Ligament 105 and diffuser 108 may comprise the same circular geometry at meter 106.

In various embodiments, surface 150 of diffuser 108 may extend parallel to axis 132 to opening 156 of ligament 105. Surface 152 of diffuser 108 may be tapered away from axis 132. In that regard, surface 152 may be oriented at a diffusion angle lambda ("λ") relative to axis 132. Diffusion angle λ may range from 5 to 15 degrees. Diffusion angle λ may be matched to diffusion angle δ (of FIG. 4). For example, diffusion angle λ may be 10 degrees. Diffusion angles λ and δ may provide cooling while maintaining the minimum clearance distance $C_D$, as illustrated in FIG. 4. Maintaining the minimum clearance distance tends to reduce cracking on a component such as a BOAS, a blade and/or a vane.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A film cooled component, comprising:
   a cooling chamber;
   a first ligament centered about a first axis and having a first inlet opening, centered about the first axis, opening directly into, flush against a first surface of, and in fluid communication with the cooling chamber;
   a first meter disposed at an end of the first ligament;
   a first diffuser extending from the first meter to a second surface of the film cooled component, wherein the first diffuser comprises a first sidewall oriented at a first diffusion angle between 5 degrees and 15 degrees relative to the first axis and a second sidewall oriented at a second diffusion angle less than 5 degrees relative to the first axis, wherein the second diffusion angle is non-zero;
   a second ligament centered about a second axis and having a second inlet opening, centered about the second axis, opening directly into, flush against the first surface of, and in fluid communication with the cooling chamber;
   a second meter disposed at an end of the second ligament; and
   a second diffuser extending from the second meter to the second surface of the film cooled component, wherein the second diffuser comprises a third sidewall oriented at a third diffusion angle of between 5 degrees and 15 degrees relative to the second axis and a fourth sidewall oriented at a fourth diffusion angle less than 5 degrees relative to the second axis, wherein the fourth diffusion angle is non-zero,
   wherein the first ligament and the second ligament are separated from each other by a first distance, wherein the first diffuser and the second diffuser are separated from each other by a second distance, wherein the first diffuser comprises a first asymmetry defined by the first diffusion angle and a second asymmetry defined by the second diffusion angle, and wherein the second diffuser comprises a third asymmetry defined by the third diffusion angle and a fourth asymmetry defined by the fourth diffusion angle, and wherein the first sidewall and the third sidewall extend away from each other.

2. The film cooled component of claim 1, wherein the first diffuser and the second diffuser have reflection symmetry.

3. The film cooled component of claim 1, wherein the second diffusion angle and the fourth diffusion angle are congruent.

4. The film cooled component of claim 1, wherein the first diffusion angle and the third diffusion angle are non-congruent.

5. The film cooled component of claim 1, wherein a wall of the first ligament and the second sidewall are disposed a same distance from the first axis.

6. The film cooled component of claim 1, further comprising at least one of a vane, a stator, or a blade outer air seal defines the first ligament, the first meter, and the first diffuser.

7. A film cooling system, comprising:
a cooling chamber;
a first film cooling hole in fluid communication with the cooling chamber and comprising a first asymmetric diffuser and a first ligament centered about a first axis and having a first inlet opening centered about the first axis, opening directly into, flush against a first surface of, and in fluid communication with the cooling chamber; and
a second film cooling hole disposed adjacent the first film cooling hole in fluid communication with a second inlet opening, centered about a second axis, opening directly into, flush against the first surface of, and in fluid communication with the cooling chamber, the second film cooling hole comprising a second asymmetric diffuser and a second ligament centered about the second axis, wherein the first ligament and the second ligament are separated from each other by a first distance, wherein the first asymmetric diffuser and the second asymmetric diffuser are separated from each other by a second distance, wherein the first asymmetric diffuser comprises a first asymmetry defined by a first diffusion angle and a second asymmetry defined by a second diffusion angle, and wherein the second asymmetric diffuser comprises a third asymmetry defined by a third diffusion angle and a fourth asymmetry defined by a fourth diffusion angle,
wherein the first diffusion angle is an angle of between 5 degrees and 15 degrees relative to the first axis and the second diffusion angle is a non-zero angle less than 5 degrees relative to the first axis,
wherein the third diffusion angle is an angle of between 5 degrees and 15 degrees relative to the second axis and the fourth diffusion angle is a non-zero angle less than 5 degrees relative to the second axis,
wherein the first diffusion angle and the third diffusion angle define respective sidewalls extending away from each other.

8. The film cooling system of claim 7, wherein the first film cooling hole comprises: a first meter disposed at an end of the first ligament, wherein the first asymmetric diffuser extends from the first meter.

9. The film cooling system of claim 8, wherein the first asymmetric diffuser comprises a first sidewall and a second sidewall with the first sidewall being tapered, and the second asymmetric diffuser comprises a third sidewall and a fourth sidewall with the third sidewall being tapered, wherein the first diffusion angle and the third diffusion angle are congruent, wherein the second diffusion angle and the fourth diffusion angle are congruent, wherein the first diffusion angle and the second diffusion angle are non-congruent.

10. The film cooling system of claim 9, wherein the second sidewall is disposed adjacent the fourth sidewall.

11. The film cooling system of claim 7, wherein the first film cooling hole is centered about the first axis and the second film cooling hole is centered about the second axis.

12. The film cooling system of claim 7, wherein the first diffusion angle and the third diffusion angle are non-congruent.

13. The film cooling system of claim 10, wherein the second sidewall and the fourth sidewall are parallel, wherein the first axis and the second axis are parallel.

14. The film cooling system of claim 7, wherein the first film cooling hole and the second film cooling hole are defined by at least one of a blade outer air seal, a stator, or a vane.

15. A gas turbine engine, comprising:
a compressor section;
a combustor aft of the compressor section and in fluid communication with the compressor section; and
a turbine section aft of the combustor and in fluid communication with the combustor, a component of the turbine section comprising:
a first film cooling hole comprising a first asymmetric diffuser and a first ligament centered about a first axis and having a first inlet opening, centered about the first axis, opening directly into, flush against a first surface of, and in fluid communication with a cooling chamber; and
a second film cooling hole adjacent the first film cooling hole and comprising a second asymmetric diffuser and a second ligament centered about a second axis and having a second inlet opening, centered about the second axis, opening directly into, flush against the first surface of, and in fluid communication with the cooling chamber,
wherein the first ligament and the second ligament are separated from each other by a first distance, wherein the first asymmetric diffuser and the second asymmetric diffuser are separated from each other by a second distance, wherein the first asymmetric diffuser comprises a first asymmetry defined by a first diffusion angle and a second asymmetry defined by a second diffusion angle, and wherein the second asymmetric diffuser comprises a third asymmetry defined by a third diffusion angle and a fourth asymmetry defined by a fourth diffusion angle,
wherein the first diffusion angle is an angle of between 5 degrees and 15 degrees relative to the first axis and the second diffusion angle is a non-zero angle less than 5 degrees relative to the first axis,
wherein the third diffusion angle is an angle of between 5 degrees and 15 degrees relative to the second axis and the fourth diffusion angle is a non-zero angle less than 5 degrees relative to the second axis,
wherein the first diffusion angle and the third diffusion angle define respective sidewalls extending away from each other.

16. The gas turbine engine of claim 15, wherein the component of the turbine section comprises at least one of a blade outer air seal, a stator, or a vane.

17. The gas turbine engine of claim 15, wherein the first asymmetric diffuser comprises a first tapered sidewall and a first non-tapered sidewall, and the second asymmetric diffuser comprises a second tapered sidewall and a second non-tapered sidewall, wherein the first diffusion angle and the third diffusion angle are non-congruent.

18. The gas turbine engine of claim 15, wherein the second diffusion angle and the fourth diffusion angle are non-zero and congruent.

19. The gas turbine engine of claim 15, wherein the second asymmetric diffuser and the first asymmetric diffuser have reflection symmetry, wherein the first axis and the second axis are parallel, wherein the first diffusion angle and the third diffusion angle are congruent, wherein the second diffusion angle and the fourth diffusion angle are non-zero and congruent, wherein the first diffusion angle and the second diffusion angle are non-congruent.

20. The film cooled component of claim 1, wherein the second axis is parallel to the first axis.

\* \* \* \* \*